AUTOMATIC FREQUENCY CONTROL CIRCUIT

Filed Dec. 14, 1948 5 Sheets-Sheet 1

INVENTOR
D. LEED
BY Patrick J. Roche
ATTORNEY

INVENTOR
D. LEED
BY
Patrick J. Roche
ATTORNEY

INVENTOR
D. LEED
BY Patrick J. Roche
ATTORNEY

Sept. 9, 1952 D. LEED 2,610,297

AUTOMATIC FREQUENCY CONTROL CIRCUIT

Filed Dec. 14, 1948 5 Sheets-Sheet 4

INVENTOR
D. LEED
BY
Patrick J. Roche
ATTORNEY

INVENTOR
D. LEED
BY
Patrick J. Roche
ATTORNEY

Patented Sept. 9, 1952 2,610,297

UNITED STATES PATENT OFFICE 2,610,297

AUTOMATIC FREQUENCY CONTROL CIRCUIT

Daniel Leed, New York, N. Y., assignor to Bell Telephone Laboratories, Incorporated, New York, N. Y., a corporation of New York Application December 14, 1948, Serial No. 65,130

10 Claims. (Cl. 250—36)

This invention relates to automatic frequency control circuits, and more specifically to such circuits in which the frequency of a controllable oscillator is maintained at a predetermined fixed difference from a reference frequency.

Heretofore in the prior art, frequency control circuits embodying frequency discriminators have been utilized to control the frequency of a controllable oscillator. Such discriminators were able to effect control within a few cycles of the desired predetermined frequency difference but were not capable of effecting control to the exact predetermined frequency difference. One illustration of such prior art circuit, of which there are many, is found in the patent of S. W. Seeley No. 2,121,103, issued June 21, 1938. Also, in the prior art automatic frequency control circuits including phase discriminators have been employed to maintain a controllable oscillator at a fixed frequency difference from a reference frequency. These circuits enabled an exact frequency control but permitted lock-in at either a lower or upper sideband, either sideband being possible in a given circuit. Illustration of such circuits are in the patent of A. F. Pomeroy No. 2,288,025, issued June 30, 1942, and in the patent of F. R. Dennis and E. P. Felch, Jr., No. 2,369,663, issued February 20, 1945. It was found in the prior art circuits that the use of a phase discriminator alone not only presented the difficulty of frequency lock-in at the desired sideband, but also tended to present the further difficulty of permitting severe oscillation in the automatic control circuit after synchronization had been completed at one or the other of the two possible sidebands, resulting in frequency modulation of the controlled oscillation. Both of these difficulties would appear to be imputable to the phase delays present in the automatic control circuit.

The present invention contemplates a frequency control circuit in which the frequency of an oscillator is locked in at an exact predetermined difference relative to a reference frequency including a positive preselection of the sideband at which the lock-in is effected.

The main object of the invention is to maintain the frequency of the output voltage of an oscillator at an exact predetermined difference from the frequency of a reference voltage.

Another object is to preselect the sideband at which frequency lock-in is effected.

A further object is to preclude extraneous oscillation in a phase sensitive loop utilized for locking in two alternating voltages at a fixed predetermined frequency difference therebetween.

Another object is to stabilize a frequency control circuit which includes a phase sensitive loop.

In a specific embodiment the invention comprises an oscillator and a source of reference frequency between the frequencies of which an exact predetermined difference is to be maintained, a generator of constant frequency, a phase discriminator for producing a potential proportional to change of the relative phase of the constant frequency and the frequency of a portion of a component derived from the waves of the oscillator and reference source, a frequency discriminator for producing from a further portion of the last-mentioned component a voltage in accordance with a derivative of the last-mentioned phase change, and reactive means for connecting the outputs of the phase and frequency discriminators to the controlled oscillator, the two discriminator output voltages being translated by the reactive means into corresponding changes in the effective reactance thereof whereby the oscillator is controlled to maintain the exact predetermined frequency difference from the reference frequency. In an alternate embodiment, the frequency of an oscillator may be maintained exactly equal to the frequency of a reference voltage so that the predetermined frequency difference therebetween is zero.

A feature of the invention involves the use of a voltage which is the derivative of the change of relative phase between two alternating voltages for instantaneously effecting frequency correction in the controlled oscillator in response to a change of frequency in the reference voltage or to a change of controlled oscillator circuit constants caused, for example, by temperature drifts. Another feature concerns the use of such derivative voltage for stabilizing the lock-in of the controlled oscillator at a desired sideband, i. e., at the upper or lower sideband. In the instance of the present invention, the derivative voltage serves to stabilize the controlled oscillator at the upper sideband. In bringing about such stabilization the derivative voltage tends to preclude extraneous oscillation in the loop including the phase discriminator. Another feature relates to the use of such derivative voltage for suppressing the unwanted sideband. A further feature involves the use of a voltage proportional to the change of relative phase between two alternating voltages, together with the above-noted derivative voltage for maintaining the frequency of a controllable oscillator at a predetermined difference from the frequency of a reference voltage.

The invention will be readily understood from the following description when taken together with the accompanying drawings in which.

Figure 1:
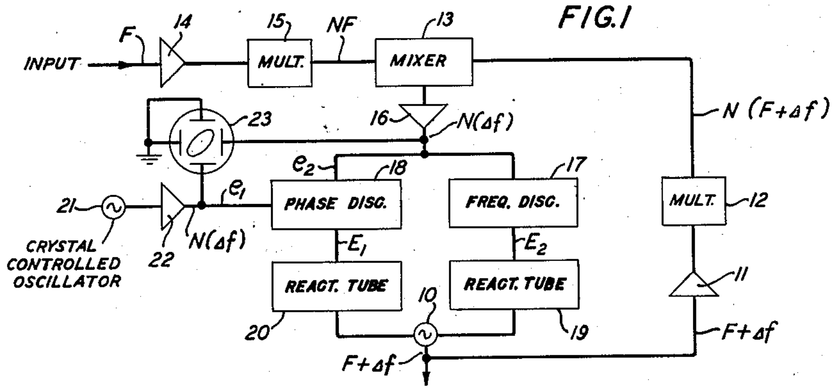
Fig. 1 is a box diagram illustrating a specific embodiment of the invention.

Referring to Fig. 1 a controllable oscillator 10 has its frequency maintained at a fixed difference $\Delta F$ from an input voltage having a reference frequency F so that the output voltage of oscillator 10 has a frequency $F+\Delta f$, for example, in a manner that will now be explained. A portion of the output voltage of oscillator 10 of frequency $F+\Delta f$ is supplied through a buffer amplifier 11 to a frequency multiplier 12 whose output is supplied to one input of mixer 13. The input voltage of reference frequency F is applied through amplifier 14 and multiplier 15 to a second input of mixer 13. The mixer 13 and multipliers 12 and 15 utilize well-known designs, the multipliers serving to multiply the frequencies of the voltages applied thereto an integral number of times N which is three for the present description as will be hereinafter mentioned, and as disclosed in the patent of F. R. Dennis-E. P. Felch, Jr., supra.

The plate-to-ground capacity in the output of mixer 13, or other suitable filtering arrangement therein, is such as to provide an adequate shunt for all modulation components except the modulation component having a frequency $N(\Delta f)$ which is applied to the input of amplifier 16. After amplification, portions of the $N(\Delta f)$ component are applied to the inputs of frequency discriminator 17 and phase discriminator 18 whose outputs activate reactance tubes 19 and 20, respectively, whereby the frequency of oscillator 10 is controlled.

A crystal-controlled oscillator 21 of conventional design generates a voltage having a constant frequency equal to the $N(\Delta f)$ frequency of the modulation component supplied to the inputs of frequency and phase discriminators 17 and 18. The voltage of oscillator 21 is supplied through amplifier 22 to the second input of phase discriminator 18. A cathode-ray oscilloscope 23 has one horizontal plate connected to the output of amplifier 22 and is thereby energized by the $N(\Delta f)$ voltage of crystal-controlled oscillator 21 and a vertical plate connected to the output of amplifier 16 and is thereby energized by the $N(\Delta f)$ component selected from the output of mixer 13. These two $N(\Delta f)$ voltages are compared by a Lissajous figure shown on the screen of oscilloscope 23 so that when the two voltages are in synchronism the Lissajous figure assumes the form of an ellipse as is well known in the art.

Figure 2:
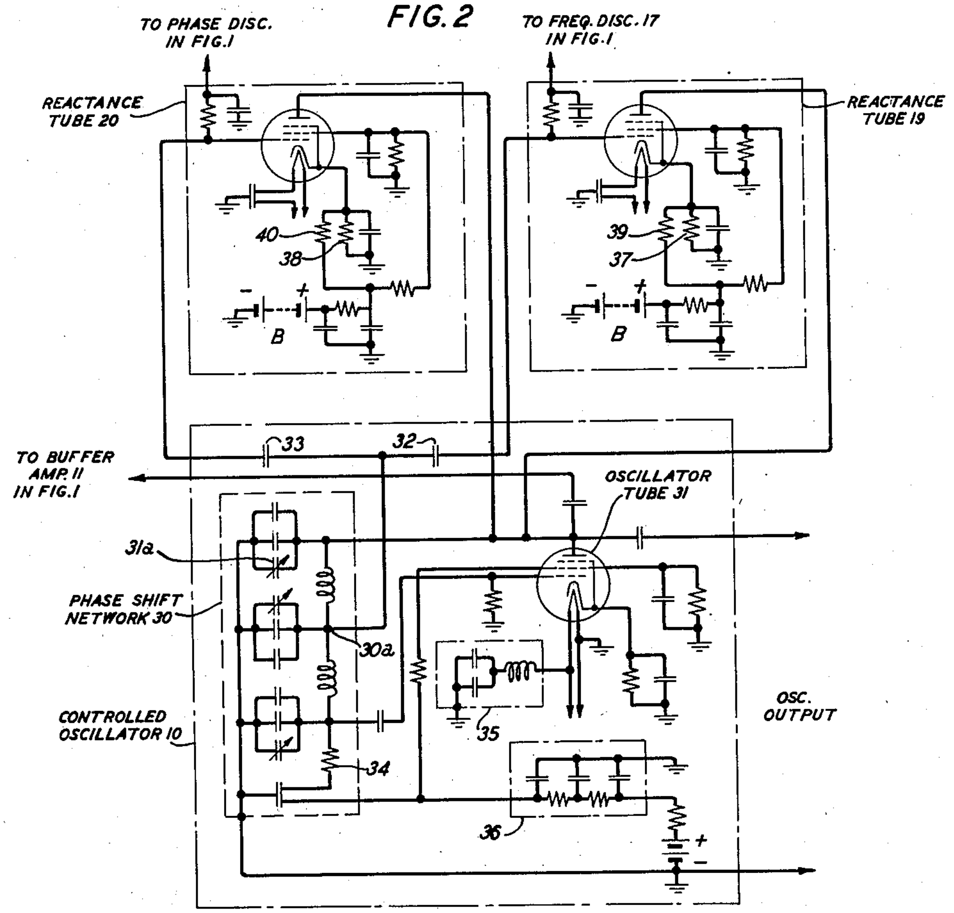
Fig. 2 is a schematic circuit of the two reactance tubes and controllable oscillator of Fig. 1.

Fig. 2 shows with more circuit details the connection of the reactance tubes 19 and 20, Fig. 1, to the controlled oscillator 10. A network 30 is connected between the plate and control grid of oscillation tube 31 of the controlled oscillator 10, i. e., in the main feedback paths of oscillation tube 31, and is proportioned to provide a total phase shift of 180 degrees between its input and output terminals for a voltage having the reference frequency F. The network 30 consists of two symmetrical $\pi$ sections of condensers and inductance in cascade, each $\pi$ section having a phase shift of 90 degrees. The voltage at the mid-point 30*a* of the network 30 is accordingly 90 degrees out of phase with the voltages at the end terminals thereof. Hence, the network 30 functions as a frequency-determining means for controlling the oscillations of oscillation tube 31, the phase shifting network 30 being connected in the feedback loop of oscillation tube 31. As a consequence, the connection of the plates of reactance tubes 19 and 20 to the plate of oscillation tube 31 establishes a reactive impedance between the plate and ground of the latter tube when the control grids of the reactance tubes 19 and 20 are alternating current coupled by condensers 32 and 33, respectively, to the mid-point of the network 30 as shown in Fig. 2.

The effective reactance of the reactance tubes 19 and 20 at a given instant serves to introduce variable reactance into the phase-shifting network 30 and thereby control the frequency of oscillation of oscillation tube 31, as determined by the transconductance of the reactance tubes 19 and 20, at the given instant. Variations of the bias applied to the control grids of the reactance tubes 19 and 20 will control the transconductance of the latter tubes. This is more fully disclosed in the copending application of F. R. Dennis, Serial No. 736,437, filed March 22, 1947, now Patent No. 2,486,265, issued October 25, 1949. The frequency of the controlled oscillator 10 can therefore be varied by changing the bias on the control grids of the reactance tubes 19 and 20. Resistance 34 constitutes a termination for network 30 at the output terminals thereof. Networks 35 and 36 serve to decouple, from the power sources, the filament and plate circuits, respectively, of the oscillation tube 31.

To minimize the degenerative effect of varying cathode voltage when the transconductance of reactance tubes 19 and 20 is being varied by changes of grid bias due to the operation of frequency and phase discriminators 17 and 18, respectively, as will be hereinafter pointed out, a fixed amount of biasing current is supplied to cathode resistors 37 and 38, Fig. 2, through resistors 39 and 40, respectively.

The control of the oscillation frequency of oscillation tube 31 by the reactance tubes in a broad sense is well known. Both reactance tubes 19 and 20 together with controlled oscillator 10, have a characteristic, for example, as that shown in Fig. 3.

Figure 4:
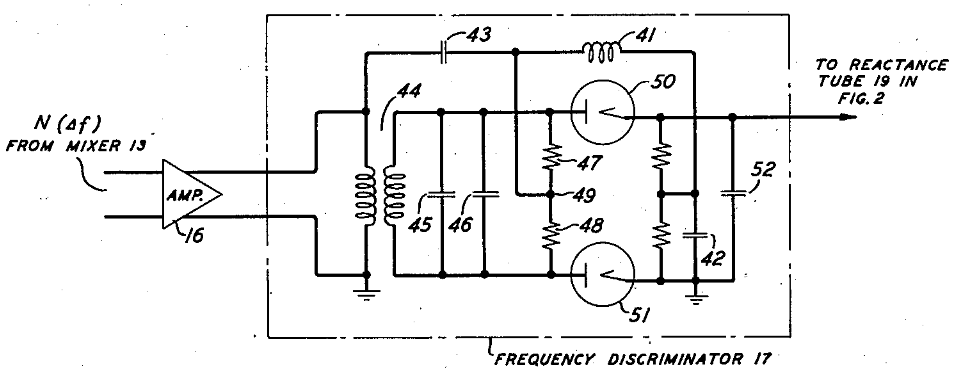
Fig. 4 is a schematic circuit of the frequency discriminator of Fig. 1.

The frequency discriminator 17 in box form in Fig. 1 is shown in detail in the schematic circuit of Fig. 4 wherein the electronic amplifier 16 is the electronic amplifier with the same reference numeral in Fig. 1. Condensers 42 and 43 possess negligible impedance over the frequency band of the discriminator 17, and the inductance 41 possesses a high impedance over this frequency band. The self-inductance of the secondary winding of transformer 44 and the capacitance of condensers 45 and 46 are resonant to voltage having the frequency N(Δf). Resistances 47 and 48 provide an electrical center with respect to the voltage across condensers 45 and 46. With reference to the junction point 49 of resistances 47 and 48, currents of equal magnitudes but opposite phase flow through the latter resistances. The voltages across resistances 47 and 48 are substantially in quadrature with the "constant alternating plate current" of pentode amplifier 16.

This is seen to be so when it is realized that, assuming transformer 44 to be ideal, the constant plate current forced into the primary winding of transformer 44 produces a constant current of opposite phase in the secondary winding of this transformer. The latter current then develops a potential across the parallel combination of condensers 45 and 46 and resistances 47 and 48. Over the frequency band of frequency discriminator 17, Figs. 1 and 4, the impedance of the above-identified parallel combination of condensers and resistances is practically entirely capacitative, and the potential developed across the combination is therefore substantially in quadrature with the current in the secondary winding of transformer 44; and, in view of the indicated phase relation between the primary and secondary windings of transformer 44, the potential across the above-identified parallel combination of condensers and resistances is in quadrature with the current in the primary winding of transformer 44.

As transformer 44 is assumed to be ideal, the impedance presented by frequency discriminator 17 to the plate of electronic amplifier 16 is equal to the impedance of primary winding of transformer 44 plus the impedance coupled into the primary winding from its secondary circuit. It may be readily shown that such impedance is substantially resistive at the frequency to which the secondary winding of transformer 44 is tuned, the latter winding being tuned to the frequency N(Δf) as hereinbefore mentioned. The alternating-current plate voltage of amplifier 16 injected at the mid-point 49 is in phase with the plate current of the electronic amplifier 16 and therefore in quadrature with the voltage across resistances 47 and 48 so that the sum of the rectified voltages added in opposition and effective across output condenser 52 is zero.

Deviations above or below the frequency N(Δf) cause the impedance presented by the frequency discriminator 17 to the plate or amplifier 16 to become inductive or capacitative depending on the sense of the deviation. Hence, the potential across the output condenser 52 will have a magnitude and polarity depending on whether the frequency of the voltage applied through amplifier 16 is above or below the frequency N(Δf). For the purpose of this illustration, the voltage across condenser 52 will have a (−) polarity for a frequency increase above the frequency N(Δf) and a magnitude dependent on the amount of such increase, and will have a (+) polarity for a frequency decrease below the frequency N(Δf) and a magnitude depending on the amount of such decrease. The mode of operation of the frequency discriminator 17 is such as illustrated by the characteristic shown in Fig. 5 whereby lock-in of the controlled oscillator 10 is effected at the upper sideband $F+\Delta f$ as above mentioned. This operation is well known in the art, one exemplification being disclosed in the patent of S. W. Seeley, supra.

Figure 6:
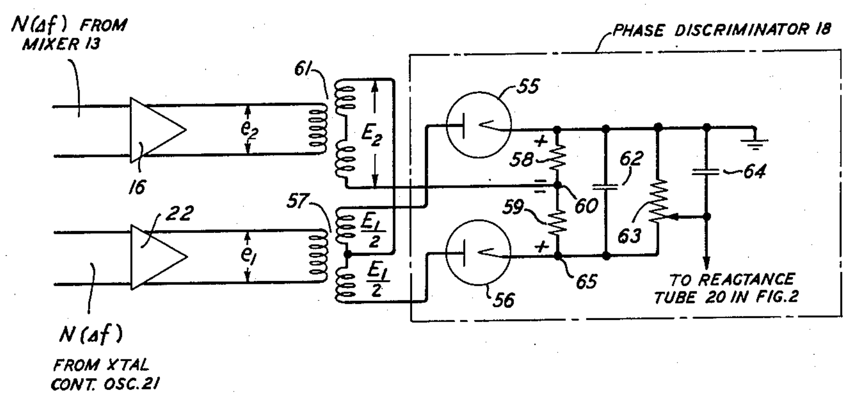
Fig. 6 is a schematic circuit of the phase discriminator of Fig. 1.

The phase discriminator 18 in Fig. 1 is shown in detail in the schematic circuit of Fig. 6 wherein the electronic amplifiers 16 and 22 are identical with the amplifiers having the same reference numerals in Fig. 1. The phase discriminator 18 in Fig. 6 includes a pair of electronic diode rectifiers 55 and 56 whose plates are directly connected to the split secondary winding of an input transformer 57 which has its primary winding connected to amplifier 22 and thereby to crystal-controlled oscillator 21, Fig. 1. The cathodes of diode rectifiers 55 and 56 are connected across a serially connected pair of resistances 58 and 59 whose common point 60 is connected to one terminal of a secondary winding of an input transformer 61, the opposite terminal of this secondary winding being connected to the midpoint of the secondary winding of input transformer 57. The primary winding of input transformer 61 is connected to the output of amplifier 16 and thereby to the output of mixer 13, Fig. 1. Across the pair of resistors 58 and 59 are connected in parallel a condenser 62 and a potentiometer 63. A condenser 64 connects the potentiometer slider to ground for filtering purposes. The phase discriminator 18 has a characteristic as shown in Fig. 7.

Figure 7:
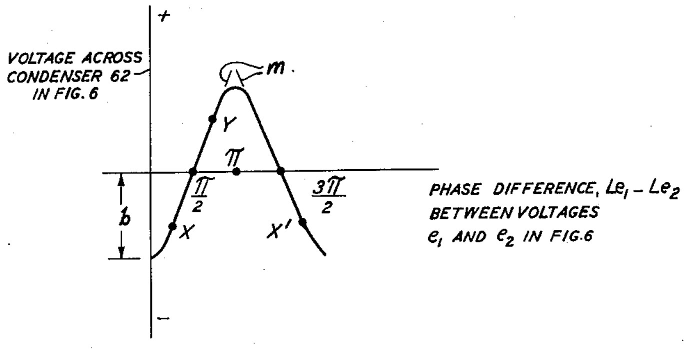
Fig. 7 is a characteristic of the phase discriminator of Figs. 1 and 6.

The phase discriminator 18 in Fig. 6 functions substantially as a phase detector as follows: Let it be assumed that the transformers 57 and 61 have unity ratio, and the voltage $e_1=E_1 \sin(\omega t+\theta)$ and the voltage $e_2=E_2 \sin(\omega t)$. Then the voltage output of phase discriminator 18, i. e., the voltage across condenser 62, is proportional to the arithmetical difference, if any, between the envelopes of the total alternating-current voltages applied to the diode rectifiers 55 and 56. Let it be further assumed that a quadrature phase relation occurs initially between the voltages $e_1$ and $e_2$ so that the phase, $\theta$, of one voltage differs from that of the other by an odd multiple of 90 degrees. Then, the arithmetical difference between the envelopes of the alternating-current voltages applied to the diode rectifiers 55 and 56 should be zero whereby a voltage of zero magnitude is caused to occur across condenser 62. This may be readily seen by reference to vector relationships shown in Fig. 8 wherein the resultants OA and OB are substantially equal, these resultants representing the peak alternating-current voltages applied to the diode rectifiers 55 and 56, respectively. As a consequence, following rectification of the alternating-current voltages represented by OA and OB, no difference occurs between the voltages across resistances 58 and 59, and the voltage across condenser 62 is zero. Hence, the phase discriminator 18 may be operating at either point $$\frac{\pi}{2} \text{ or } \frac{3\pi}{2}$$

of its characteristic shown in Fig. 7.

Now, let it be assumed that a change of phase occurs between the voltages $e_1$ and $e_2$ so that the phase difference $\theta$ is no longer an odd multiple of 90 degrees. As a consequence, a difference will occur between the resultant total alternating-current voltages applied to the diode rectifiers 55 and 56, and therefore between the rectified voltages across resistances 58 and 59. The arithmetical difference between these voltages will be reflected as a voltage on condenser 62 in Fig. 6 with a polarity which will be presently identified. This will be evident from the vector relationships n Fig. 9, constructed for the case in which $\theta$ is less than 90 degrees wherein the resultant O'A' is larger than the resultant O'B', these resultants representing the amplitudes of the total alternating-current voltages applied to the diode rectifiers 55 and 56, respectively. In view of the above, the point 65 is negative with respect to ground whereby the voltage on condenser 62 has a negative polarity, and the phase discriminator 18 is operating, for example, at a point X on its characteristic shown in Fig. 7. Where the resultant O'B' becomes larger than the resultant O'A' in Fig. 9, then the point 65 in Fig. 6 would be positive with respect to ground thereby placing a positive charge on condenser 62 to an extent depending on the arithmetical difference between the latter two resultants. Hence, the phase discriminator 18 would be operating, for example, at a point Y on its characteristic shown in Fig. 7. For $\theta$ angles greater than 180 degrees the variation of the voltage across condenser 62 follows the negative slope of the characteristic in Fig. 7. The operation of the phase discriminator 18 in proximity of point $$\frac{\pi}{2}$$

of its characteristic in Fg. 7 favors the upper sideband whereas the operation in proximity of the point $$\frac{3\pi}{2}$$

favors the lower sideband. This type of phase discriminator or phase detector is essentially disclosed in the patent of A. F. Pomeroy, supra.

Figure 8:
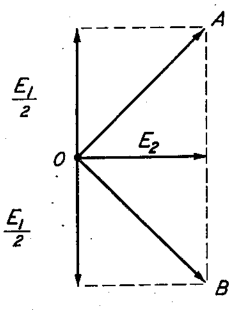
Figs. 8 and 9 are vector diagrams illustrating the principles of operation of the phase discriminator of Figs. 1 and 6.

The vectorial representations shown in Figs. 8 and 9 may be solved as follows: As previously mentioned in connection with a change of phase, relative to 90 degrees, between voltages $e_1$ and $e_2$ in Fig. 6, it was assumed that $$e_1 = E_1 \sin(\omega t + \theta)$$
$$e_2 = E_2 \sin(\omega t)$$

Figure 9:
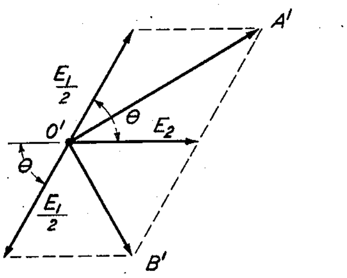

To simplify the vector analysis of Fig. 6 as represented in Fig. 9, it will be further assumed that $$\frac{E_1}{2} = E_2 = E$$

Then, from the law of cosines, the total alternating-current voltage applied to rectifier 55 in Fig. 6 is $$O'A' = \sqrt{E^2 + E^2 + 2E^2 \cos\theta}$$

and the total alternating-current voltage applied to rectifier 56 in Fig. 6 is $$O'B' = \sqrt{E^2 + E^2 - 2E^2 \cos\theta}$$

As previously indicated, the voltage across condenser 62 in Fig. 6 is equal to the arithmetical difference between the rectified values of total alternating-current voltages applied to the rectifiers 55 and 56, then $$E_{C62} = O'A' - O'B'$$
$$= E\sqrt{2(1+\cos\theta)} - E\sqrt{2(1-\cos\theta)}$$
$$= 2E\left(\cos\frac{\theta}{2} - \sin\frac{\theta}{2}\right)$$

Therefore, the phase discriminator 18 has the characteristic shown in Fig. 7 as above stated. As plotted from empirical data, the characteristic curve of Fig. 7 was found to possess substantially linear ranges for $\theta$ angles greater than 30 degrees but less than 150 degrees, and greater than 210 degrees but less than 330 degrees. Hence, over such ranges of the characteristic curve in Fig. 7, it may be assumed that the voltage across condenser 62 in Fig. 6 is $$E_{C62} = m\theta + b$$

that is, a linear relationship between $E_{C62}$ and $\theta$, where $m$ and $b$ are constants, $m$ being the slope of the aforementioned linear portions of the characteristic curve in Fig. 7 and $b$ the intercept of the latter slope on the Y axis. Referring to Fig. 7, it will be observed that the slopes $m$ of the two curves are substantially centered at $$\frac{\pi}{2} \text{ and } \frac{3\pi}{2}$$

The circuit of Fig. 1 operates to effect two controlling operations, viz: (1) to establish the output voltage of the controlled oscillator 10 at the predetermined frequency $F+\Delta f$ for an input voltage having a reference frequency F, and (2) to maintain such voltage precisely at the latter frequency regardless of changes in the reference frequency F of the input voltage F or in the frequency determining circuit constants of oscillator 10, in a manner that will be presently explained. Let it be initially assumed for the purpose of this explanation that the circuit of Fig. 1 is adjusted to a steady state condition in which an input voltage has a reference frequency F (15 megacycles) and that the output voltage of the controlled oscillator 10 is to be maintained at the frequency $F+\Delta f$ (15 megacycles+31 kilocycles). As a consequence, mixer 13 has applied to the input thereof, (1) a first voltage having the frequency 3F (45 megacycles) from the output of multiplier 15, and (2) a second voltage having the frequency $N(F+\Delta f)$ or 3(15 megacycles+31 kilocycles) or 45 megacycles+93 kilocycles from the output of multiplier 12. It is therefore apparent that the multipliers 12 and 15 function as frequency triplers whereby the term N in each of the expressions NF and $N(F+\Delta f)$ has the numerical value 3. As previously mentioned, this multiplication is disclosed in the patent of F. R. Dennis-E. P. Felch, Jr., supra.

The voltage selected from the output of mixer 13 and applied through amplifier 16 to the inputs of frequency and phase discriminators 17 and 18, respectively, has the frequency $N(\Delta f)$ or 93 kilocycles. The comparison voltage supplied from the crystal-controlled oscillator 21 through amplifier 22 to a second input of phase discriminator 18 also has the frequency $N\Delta f$) or 93 kilocycles. A no-voltage charge is present on condenser 52 of the frequency discriminator 17 in Fig. 4 so that the latter is operating at the point $N(\Delta f)$ on its characteristic in Fig. 5; and by adjustment of frequency determining condenser 31a of controlled oscillator 10 in Fig. 2 the phase difference between the above-mentioned inputs to phase discriminator 18 is 90 degrees, so that a no-voltage charge is present on the condenser 62 of the phase discriminator 18 in Fig. 6 and operation is at the point $$\frac{\pi}{2}$$

on the phase discriminator characteristic in Fig. 7. Finally, with the above assumed conditions the frequency of the controlled oscillator 10 is held precisely at $F+31$ kilocycles or 15 megacycles+31 kilocycles, as will be noted by reference to the reactance tubes 19 and 20 characteristic shown in Fig. 3, and operation of Fig. 1 is initially at the point A on the latter curve.

Figure 10:
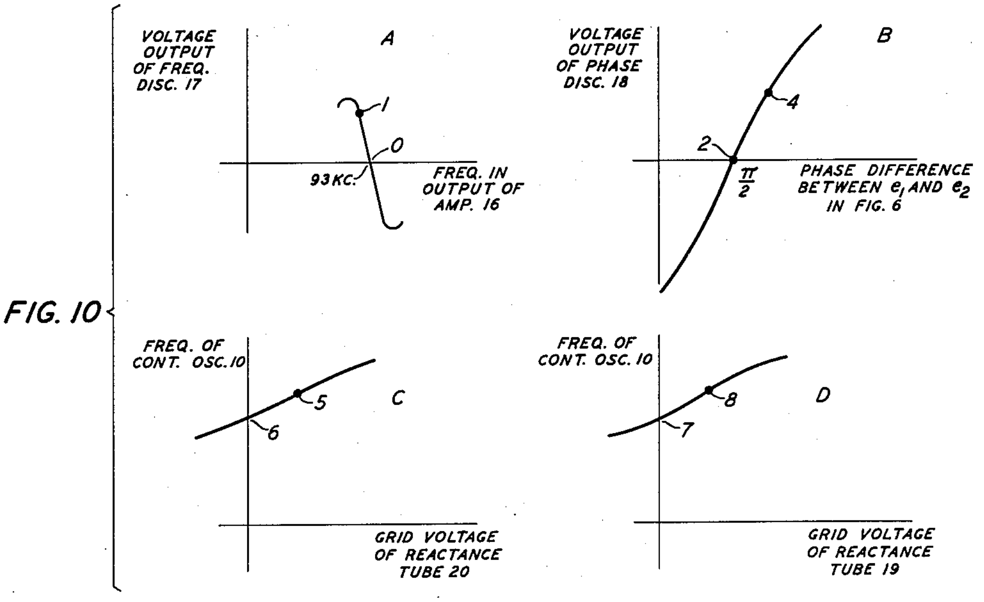
Fig. 10 is a family of characteristics illustrating certain action in the frequency and phase discriminators of Figs. 1, 4 and 6.

For the purpose of subsequent explanation, under the initially assumed steady state condition in Fig. 1, it will be understood: 1, that such steady state condition has persisted for a sufficient time duration that all transients due to a previous change in the reference frequency F of the input voltage have decayed to zero; 2, that before any change takes place in the reference frequency F, the input voltage has the reference frequency F, and the voltage output of the controlled oscillator 10 has the frequency $F+\Delta f$; 3, that by a manipulation of a frequency-controlling condenser 31a in the controlled oscillator 10, Fig. 2, the operating strain on the circuit of Fig. 1 was reduced substantially to zero as noted above; 4, that, as a consequence of the foregoing, the operating condition of the circuit of Fig. 1 at the initial time $t=0$ is illustrated by the points 0, 2, 6 and 7 in the characteristic curves A, B, C and D, respectively, of Fig. 10; and 5, that no circuit delays are present in Fig. 1 except a virtual delay introduced by the feature of integration in the phase sensitive loop as will be pointed out later herein. It will be further understood that the curves in Figs. 10A, 10B, 10C and 10D are identical with the curves in Figs. 5, 7 and 3, respectively, the family of curves in Fig. 10 being for the purpose of facilitating visual inspection of certain action in Fig. 1.

Now, let it be assumed that the input voltage has changed from a reference frequency F to a new reference frequency $F+\Delta f_1$. As a consequence, the output voltage of multiplier 15 will have the frequency $N(F+\Delta f_1)$, and the voltage selected from the output of mixer 13 and applied through amplifier 16 to the frequency discriminator 17 has a frequency $N(F+\Delta f)-N(F+\Delta f_1)$ or $N(\Delta f-\Delta f_1)=\Delta f_2$. Therefore, a frequency error $N(\Delta f_1)$ occurs in the voltage applied to the input of frequency discriminator 17. Thus far, no error of phase has developed at the phase discriminator 18 between the two voltage inputs having the frequencies of $N(\Delta f)$ and $\Delta f_2$. Hence, at the instant of the change of the input voltage from frequency F to frequency $F+\Delta f_1$, the phase discriminator 18 exerts no corrective force on the controlled oscillator 10, and for the moment may be deemed to be inoperative; but at the same time, however, the frequency discriminator 17 is operative to effect its full corrective force in a manner that will be presently explained. The latter force serves to increase the frequency of the output voltage of the controlled oscillator 10 by an amount depending upon the effective gain of the frequency loop, i. e., the loop including frequency discriminator 17, reactance tube 19, oscillator 10, amplifier 11, multiplier 12, mixer 13, and amplifier 16. In the embodiment described, this frequency loop has a gain of 30, and it is therefore effective at the time $t_1$, negligibly soon following $t=0$, to cut the initial frequency error $N(\Delta f_1)$ substantially to one-thirtieth thereof before the phase discriminator 18 commences to exert its corrective force in a manner to be explained hereinafter.

The foregoing will be clearer from a consideration of the numerical values assigned for the purpose of this explanation. In this connection, there is assumed a change $\Delta f_1$ (1 kilocycle) in the frequency F of the input voltage. Hence, the input voltage will be assumed to have a new reference frequency $F+\Delta f_1$ or 15 megacycles+1 kilocycle. From this, the output voltage of multiplier 15 will have the frequency $N(F+\Delta f_1)$ or 45 megacycles+3 kilocycles and the voltage selected from the output of the mixer 13 and applied through amplifier 16 to the inputs of the frequency and phase discriminators 17 and 18 will have the frequency $N(F+\Delta f)-N(F+\Delta f_1)$ or $\Delta f_2$, i. e., 3(15 megacycles+31 kilocycles)—
3(15 megacycles+1 kilocycle)

or (45 megacycles+93 kilocycles)—
(45 megacycles+3 kilocycles)

or the frequency $\Delta f_2$ of 90 kilocycles. Thus, a frequency error of $N(\Delta f_1)$ or 3 kilocycles will occur in the voltage applied to the input of frequency discriminator 17. Due to the gain 30 of the above-traced frequency loop, the initial error, $N(\Delta f_1)$, of 3 kilocycles is reduced substantially to one-thirtieth thereof, i. e. to 100 cycles $(3{,}000\times 1/30)$. Accordingly, the assumed new operating condition of Fig. 1 at the instant $t_1$, i. e., immediately following the corrective effect of frequency discriminator 17, may be represented by the point 1 in Fig. 10A; the point 2 in Fig. 10B but commencing to move upwardly; the point 6 but commencing to move rightwardly in Fig. 10C, and the point 8 in Fig. 10D.

Figure 11:
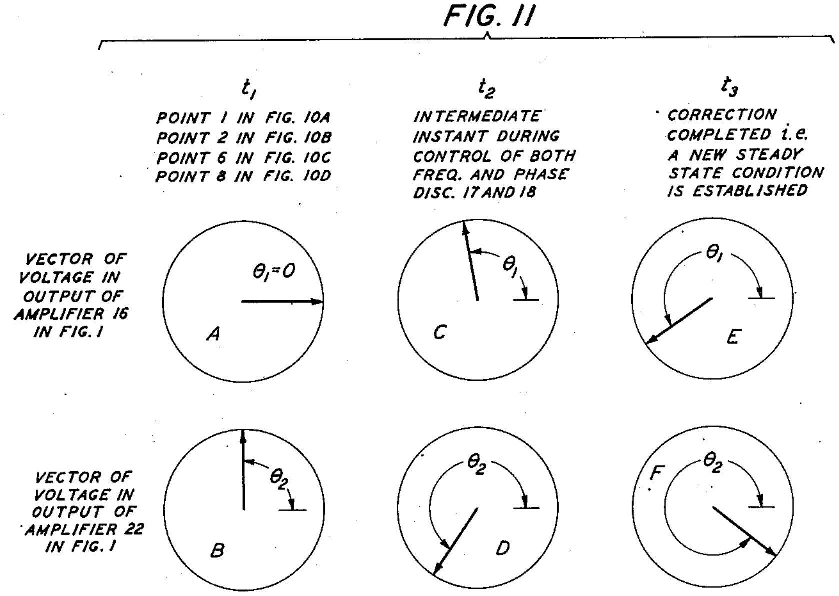
Fig. 11 is a family of vector diagrams illustrating certain action in Fig. 1.

At the instant $t_1$, the phase of the voltage produced by the crystal-controlled oscillator 21 applied to phase discriminator 18 through amplifier 22, and having the frequency $N(\Delta f)$, or 93 kilocycles, tends to advance with reference to the phase of the voltage having the frequency of 93 kilocycles—100 cycles, the latter being applied from the output of amplifier 16 to the phase discriminator 18. This may be readily illustrated from the vector relationships shown in Fig. 11. The horizontal vector of zero phase in Fig. 11A represents the voltage having frequency of 93 kilocycles—100 cycles in the output of amplifier 16 and supplied to the inputs of frequency discriminator 17 and phase discriminator 18 at the instant $t_1$, immediately following the coarse correction effected by the frequency discriminator 17, i. e. at the instant when the phase discriminator 18 commences to exert the fine correction that will now be explained. The vertical vector shown in Fig. 11B represents the voltage having frequency 93 kilocycles in the output of amplifier 22, the vector in Fig. 11B being 90 degrees ($\theta_2-\theta_1=90$ degrees) ahead of the vector in Fig. 11A as a result of previously indicated initial conditions (3) and (4). Thus, the vector in Fig. 11A is moving at a velocity corresponding to the frequency of 93 kilocycles—100 cycles while the vector in Fig. 11B is moving at a velocity corresponding exactly to the frequency of 93 kilocycles.

The combined effect of the frequency and phase discriminators 17 and 18, respectively, is ultimately to increase the velocity of the vector (93 kilocycles—100 cycles) in Fig. 11A until it exactly equals the velocity of the vector (93 kilocycles) in Fig. 11B but not necessarily to reestablish the initial phase relative thereof. Obviously, the constant frequency vector in Fig. 11B will travel a greater angular distance than the vector in Fig. 11A during the correction interval due to the greater velocity of the former. In view of the difference between the velocities of the two vectors, the phase difference between the voltages present in the outputs of amplifiers 22 and 16 and supplied as inputs to phase discriminator 18 tends to increase whereby a positive voltage tending to increase correspondingly is developed in the output of phase discriminator 18. This voltage applied to reactance tube 20 tends to increase the frequency of oscillation of oscillation tube 31, Fig. 2, and thereby the frequency of the output voltage of the controlled oscillator 10 as shown in Fig. 10C. This tends further to reduce to less than 100 cycles the frequency error in the voltage inputs to both frequency and phase discriminators 17 and 18.

At the intermediate instant $t_2$, i. e., after the phase discriminator 18 has commenced to exert its corrective force by means of its control over reactance tube 20, the vector of the voltage in the output of amplifier 16 will occupy, for example, the position shown in Fig. 11C having the angle $\theta_1$ with reference to its initial position shown in Fig. 11A. At the same time the vector of the crystal-controlled voltage in the output of amplifier 22 will occupy, for example, the position shown in Fig. 11D and have the angle $\theta_2$ in the latter figure. Bearing in mind that the velocity of the vector in Fig. 11D is greater than that of the vector in Fig. 11C as above mentioned, it will be obvious that the angular difference between the vectors in Figs. 11D and 11C will tend to increase to the relation of 90 degrees $+\Delta\theta$, the term $\Delta\theta$ representing the angular advance of the vector in Fig. 11D over that in Fig. 11C at the time $t_2$. Therefore, in Figs. 11D and 11C, $\theta_2-\theta_1=90$ degrees$+\Delta\theta$. In this connection, it will be obvious that the phase difference between the vectors in Figs. 11D and 11C has increased beyond what it was in Figs. 11A and 11B. The positive voltage developed in the output of phase discriminator 18 and applied from condenser 62 in Fig. 6 to reactance tube 20 in Fig. 2 tends further to increase the frequency of oscillation of oscillation tube 31 and thereby the frequency of the output voltage of the controlled oscillator 10 in Fig. 1. Due to increased frequency, the velocity of voltage vector in Fig. 11C will tend to increase with advancing time, thereby tending to diminish the rate of growth of the angular advance $\Delta\theta$ of the vector in Fig. 11D thereover. Hence, at the time $t_2$ in Figs. 11C and 11D, i. e. at an intermediate instant of correction by the phase discriminator 18, the term $\Delta\theta$ increases, but at a decreasing rate of growth.

As the new steady state condition in Fig 1 is approached and the need for frequency correction becomes less acute, the rate of progression along the curve in Fig. 10B decreases until the operation of Fig. 1 finally stabilizes at the time $t_3$ in Figs. 11E and 11F of complete correction in proximity of point 4 in Fig. 10B. Thus, the vector of the voltage in the output of amplifier 16 in Fig. 1 will occupy, for example, the position shown in Fig. 11E having the angle $\theta_1$ with reference to its initial position in Fig. 11A. At the same time the vector of the crystal-controlled voltage in the output of amplifier 22 will occupy, for example, the position shown in Fig. 11F and have the angle $\theta_2$.

For the new steady state condition, it will be apparent that the voltage in the output of amplifier 16 will have a frequency of 93 kilocycles identical with 93-kilocycle frequency of the voltage supplied by the crystal-controlled oscillator 21 through amplifier 22; that due to identical frequencies, the velocity of the vectors in Figs. 11E and 11F will be the same; and that the angular advance $\Delta\theta$ of the vector in Fig. 11F over the vector in Fig. 11E has reached the point beyond which further reduction cannot be effected, the term $\Delta\theta$ now having substantially a constant value. With the correction completed as shown in Figs. 11E and 11F, $\theta_2-\theta_1=90$ degrees$+(\Delta\theta)_1$. The term $(\Delta\theta)_1$ is the final angular advance of the vector, Fig. 11F, representing the voltage of the crystal-controlled oscillator 21 over the vector, Fig. 11E, representing the voltage in the output of amplifier 16 during the time interval required to restore the frequency of the controlled oscillator 10 to the $F+\Delta f$ value, in response to the assumed 1-kilocycle change in the reference frequency F of the input voltage in Fig. 1 mentioned previously. In this connection it will be understood that the phase difference between the vectors in Figs. 11F and 11E remains constant but increased over what it was in Figs. 11B and 11A. As will be mentioned hereinafter, the frequency difference $\Delta f$ may also be zero. The new steady state operating condition of Fig. 1 may be represented by (a) the point 0 in Fig. 10A, since the voltage output of amplifier 16 has the frequency $N(\Delta f)$ or 93 kilocycles at the conclusion of the correction; (b) the point 7 in Fig. 10D because the point 0 in Fig. 10A causes a return to the former point; (c) at the point 4, Fig. 10B; and (d) the point 5 in Fig. 10C, the two next preceding items (c) and (d) being due to the term $(\Delta\theta)_1$ explained hereinbefore in connection with Fig. 6. For a decrease in reference F of the input voltage in Fig. 1, an opposite action takes place.

It will be understood that the frequency and phase discriminators 17 and 18, shown in Figs. 4 and 6, respectively, and the controlled oscillator shown in Fig. 2 were selected for the purpose of illustrating the invention; and that other frequency and phase discriminator types and means for controlling the frequency of an oscillator known in the art may be alternately employed in Fig. 1.

In analyzing the operation of the over-all controlled oscillator circuit in Fig. 1, the latter may be viewed as an electronic servo-mechanism.

As is well known, the function of a servo-mechanism is to control an "output" quantity so that it invariably bears some fixed relation to an "input" or reference quantity. This is accomplished by controlling the output according to some function of the deviation from the specific relation between input and output which it is desired to maintain. This deviation is called the system "error." In the case of a simple mechanical remote positional control servo the error is frequently the difference between the angular settings of a local and a remotely located shaft. This error, or difference between the two shaft angles is translated by some method of conversion to corresponding electrical voltage which actuates a motor controlling the position of the remotely located shaft in such a fashion that the error tends to be annihilated. This type of control has been called "closed-cycle," because the angle of the output shaft of the "controller," or motor, is compared with that of the input shaft and the product of this comparison is then used to energize the motor.

All of the elements of a servo-mechanism may be recognized in the circuit of Fig. 1. The input may be considered the frequency F, and the output, the frequency of controlled oscillator 10. The relation to be maintained between input and output is not equality, as in the above mechanical example, but one in which the output is held at a constant frequency difference with respect to the input. In the embodiment described in this specification, the output, or frequency of controlled oscillator 10 is automatically maintained at the frequency $F+\Delta f$, in upper sideband relation to the input frequency F. Strictly speaking, the error of this system is the extent to which the frequency of oscillator 10 fails to be in exactly the desired sideband relation to reference frequency F. If $F_1$ is the frequency of oscillator 10, and $F+\Delta f$ the ideally correct frequency, then the error is $F_1-(F+\Delta f)$. Because of the multiplication stages 12 and 15 in the circuit of Fig. 1 the reactance tubes 19 and 20, or servo "controllers" are actuated by functions of $$N.(F_1-(F+\Delta f))$$

where N is the multiplication factor and therefore in subsequent discussion the latter quantity will more conveniently be referred to as the system error. The error convertors or translators are the frequency discriminator 17 and phase discriminator 18 which translate the frequency error to voltages adaptable for controlling the frequency of oscillator 10 through the reactive means afforded by the reactance tubes 19 and 20.

In an alternative view, the "regulated quantity" can be taken to be the phase of the output voltage of controlled oscillator 10. As frequency and phase are integrally related, a control of one implies control of the other. As is well known in the electrical art, a wave of varying frequency may be represented by a vector rotating about a central point, Fig. 11, and possessing a fixed length, if the wave is unmodulated in amplitude and traversing between two instants of time an angle which is proportional to the time integral of the instantaneous frequency. The position of such vector at some instant in relation to a reference line intersecting the axis of rotation is the "instantaneous phase," or merely phase. Obviously, then, when phase is under control, its derivative "instantaneous frequency" or merely frequency is implicitly controlled, and vice versa.

Accordingly, the controlled oscillator circuit in Fig. 1 may be considered (1) a frequency servo-mechanism, or (2) a phase servo-mechanism. In the consideration as a frequency servo-mechanism, it will be subsequently demonstrated that such frequency servo-mechanism, to a first degree of approximation, belongs in that class of servo-mechanisms in which the correcting force for controlling the output of the mechanism is actuated by voltage data proportional to "frequency error plus time integral of frequency error," or what is often called "proportional plus integral control." Such control is so designated in a book "Transients in Linear Systems," by Messrs. M. F. Gardner and J. L. Barnes (John Wiley and Sons, 1942), page 194. In the consideration as a phase servo-mechanism, it will be also demonstrated hereinafter that such phase servo-mechanism, to a first degree of approximation, belongs to the class of servo-mechanisms in which the correcting force for controlling the output of the mechanism is energized by voltage data proportional to "phase error plus the time derivative of phase error."

In the consideration as a frequency servo-mechanism, the presence of the integral component presently to be demonstrated insures that the steady state error is reduced to zero. This is well known in the art of servo-mechanisms. If such system is shocked, as for example by a sudden increment in the magnitude of the input quantity, a corrective transient ensues to raise the regulated output quantity by an equal increment. When the transient subsides, and the steady state again prevails, static error is non-existent, and the output has "locked in" or "synchronized" with the new input level. Such an integral component is present in the controller law of the automatic frequency control circuit in Fig. 1 for providing "zero frequency error" in the frequency $F+\Delta f$ of the output voltage of the controllable oscillator 10. The integral component of control is supplied by the phase discriminator 18, and the linear component directly proportional to frequency error is supplied by the frequency discriminator 17.

In this connection it will now be demonstrated that the phase discriminator 18 produces an output voltage which is instantaneously proportional over the linear ranges of its characteristic, as discussed above regarding Figs. 6 and 7, to the time integral of frequency error, i. e., to the time integral of the instantaneous frequency difference between the two inputs to the phase discriminator 18. The output voltage supplied by the phase discriminator 18 results from the envelope detection of the two voltages applied to the diodes 55 and 56 thereof. As the phase discriminator circuit of Fig. 6 includes a filter composed of resistances 58 and 59, potentiometer 63 and condensers 62 and 64, a finite time constant of delay results therefrom, and determines a maximum rate of change of the voltage envelopes as applied to the diodes 55 and 56 of the phase discriminator 18 in Fig. 6, which can be followed. This implies a maximum rate of change of phase between the inputs to which the output filter can respond, and thereby restricts the range of time varying frequency difference to which the phase discriminator 18 can respond as an integrator. This is the ancient problem of delay in servo-demodulators. The integration concept herein therefore applies only when the phase differential between the two alternating-current voltage inputs to the phase discriminator 18 is varying at a rate slower than a specific rate which is roughly computable from the filter constants.

As above pointed out, the steady state characteristic of the phase discriminator 18, Fig. 6, is given by the characteristic in Fig. 7 in which the slopes $m$ are substantially centered at points $$\frac{\pi}{2} \text{ and } \frac{3\pi}{2}$$

Now, let it be initially assumed that the voltages $e_1$ and $e_2$ in Fig. 6 have the same frequency but voltage $e_2$ lags the voltage $e_1$; that the phase discriminator 18 is operating at the point $$\frac{\pi}{2}$$

on its characteristic curve in Fig. 7; and that an output voltage $E_1$ effective across the condenser 62 is zero. As a consequence, the phase-time relation between $e_1$ and $e_2$ can be represented at a time instant $t=0$ by the vectors in Figs. 11A and B which are rotating in a counter-clockwise direction. From a phase viewpoint, it is only necessary to consider the instantaneous directions of the vectors in Figs. 11A and B.

Let it be assumed for this explanation that at the instant $t=t_1$, both vectors in Figs. 11A and B are in motion with an angular velocity $\omega_0$ corresponding to the frequency $$F_0=\frac{\omega_0}{2\pi}$$

Now let it be further assumed that the vector in Fig. 11B is suddenly accelerated, i. e., the frequency of voltage $e_1$ in Fig. 6 is increased and has a velocity $\omega_1(t)$; and that the frequency of voltage $e_2$ is maintained at the velocity $\omega_2=\omega_0$. At the time $t=t_1$, the vectors in Figs. 11A and B are 90 degrees out of phase, but during the next succeeding interval $\Delta t$, the vector velocity corresponding to frequency $\omega_1$ is $\omega_0+\Delta\Omega_1$ where $\Delta\Omega_1$ is the difference between the average velocity of $\omega_1(t)$ and the velocity $\omega_2$ during the interval $\Delta t$. Consequently, at the end of time $\Delta t$, the vector in Fig. 11B will have moved through an increment of angle $\Delta t(\omega_0+\Delta\Omega_1)$, and the vector in Fig. 11A will have moved through $\Delta t(\omega_0)$. Now let it be assumed that at the instant $t=t_1+\Delta t$, the frequency of the vector in Fig. 11B is returned to the velocity $\omega_1=\omega_0$ which is maintained for $\Delta t$ seconds. During the latter interval then, the velocity $\omega_1$ equals the velocity $\omega_2$, i. e., $\omega_1=\omega_2$ whereat the steady state condition prevails. But now the phase relationship between voltages $e_1$ and $e_2$ has changed because the angle of the vector in Fig. 11B has advanced a farther angular distance than did the vector in Fig. 11A.

Therefore, the phase difference between the vectors in Figs. 11A and B during the first steady state interval $$=\frac{\pi}{2}+\Delta t(\omega_0+\Delta\Omega_1)-\Delta t(\omega_0)$$

$$=\frac{\pi}{2}+\Delta t\Delta\Omega_1$$

where $$\frac{\pi}{2}+\Delta t(\omega_0+\Delta\Omega_1)$$

is the angle of the vector in Fig. 11B and $\Delta t(\omega_0)$ is the angle of the vector in Fig. 11A, and $$E_1=m.(\Delta t\Delta\Omega_1)$$

where $E_1$ is the output across condenser 62 in Fig. 6 during the first steady state interval and $m$ is the linear slope in Fig. 7.

At the instant $t=t_1+2\Delta t$, the velocity of the vector in Fig. 11B is again increased to $\omega_0+\Delta\Omega_2$, which is maintained for another interval $\Delta t$. $\Delta\Omega_2$ represents the average velocity difference between the vectors during the interval between $t=t_1+2\Delta t$ and $t=t_1+3\Delta t$. At the instant $t_1+3\Delta t$, the velocity $\omega_1(t)$ of the vector in Fig. 11B is again returned to the velocity $\omega_1(t)=\omega_0$ for $\Delta t$ seconds. During this second steady state interval, the difference between angles of the vectors in Figs. 11A and B $$=\frac{\pi}{2}+\Delta t(\omega_0+\Delta\Omega_1)+\Delta t(\omega_0+\Delta\Omega_2)-\omega_0\Delta t-\omega_0\Delta t$$

$$=\frac{\pi}{2}+\Delta t(\Delta\Omega_1+\Delta\Omega_2)$$

where $$\frac{\pi}{2}$$

is the initial angle of the vector in Fig. 11B; $\Delta t(\omega_0+\Delta\Omega_1)$ is the angular increment to the vector in Fig. 11B at the instant $t=t_1+\Delta t$; $\Delta t(\omega_0+\Delta\Omega_2)$ is the angular increment to the vector in Fig. 11B at the instant $t=t_1+3\Delta t$; the first $\omega_0\Delta t$ is the angular increment to the vector in Fig. 11A at the instant $t=t_1+\Delta t$; and the second $\omega_0\Delta t$ is the angular increment to the vector in Fig. 11A at the instant $t=t_1+3\Delta t$; and $$E_2=m(\Delta\Omega_1+\Delta\Omega_2)\Delta t$$

where $E_2$ is the output across condenser 62 in Fig. 6 during the second steady state interval; and $m$ is the linear slope in Fig. 7.

For the $n$th interval $$E_n=m(\Delta\Omega_1+\Delta\Omega_2+\ .\ .\ .\ \Delta\Omega_n)\Delta t$$

$$E_n=m.\Sigma^n{}_{k=1}\Delta\Omega_k\Delta t$$

Assuming $n\rightarrow\infty$, within an interval $0<t<T$, $\Delta t\rightarrow dt$, $$\Sigma\rightarrow\int_0^t$$

then $$E(t)=m\int_0^t\Delta\omega(t)dt \qquad (1A)$$

where $\Delta\omega(t)$ is the time varying velocity difference $\omega_1(t)-\omega_2$ approached by the discrete velocity differences $\Delta\Omega_k$ in passing to the limit. Also $$E(t)=2\pi m\int_0^t\Delta f(t)dt \qquad (1B)$$

since $$\Delta\omega(t)=2\pi\Delta f(t)$$

In Equations 1A and 1B, $E(t)$ is the voltage output of the discriminator 18 in Figs. 1 and 6, and is a function of $\Delta f(t)$, the instantaneous frequency difference between the voltages $e_1$ and $e_2$ in Fig. 6.

Therefore, from Equation 1B $$E_{C62}=2\pi m\int_0^t\Delta f(t)dt \qquad (2)$$

where $E_{C62}$ is the voltage across condenser 62 in Fig. 6, during a period of frequency correction.

Note that the foregoing integral relations apply only when the varying phase difference, $$\int_0^t\Delta\omega(t)dt$$

between $e_1$ and $e_2$, is confined to the substantially linear range of the phase discriminator characteristic in Fig. 7 wherein the slope $m$ may be considered constant.

As it is convenient to think in terms of rotating vector analogue to electrical frequency, the instantaneous velocities $\omega_1$, $\omega_2$, $\omega_3$, and $\omega_4$ may be assumed to represent voltages in Fig. 1 having the frequencies $N(\Delta f)$ (crystal controlled oscillator 21 $N(\Delta f)$ (steady state output of amplifier 16 from the mixer 13), NF (output of multiplier 15), and $N(F+\Delta f)$ (steady state output of multiplier 12), respectively.

From Equation 1A, $$E_1=m\int_0^t\Delta\omega(t)dt$$

the phase discriminator 18 output voltage.

Therefore, $$E_1=m\int_0^t(\omega_1-\omega_2)dt \qquad (3)$$

thus demonstrating the integrating property of the phase discriminator 18.

Figure 5:
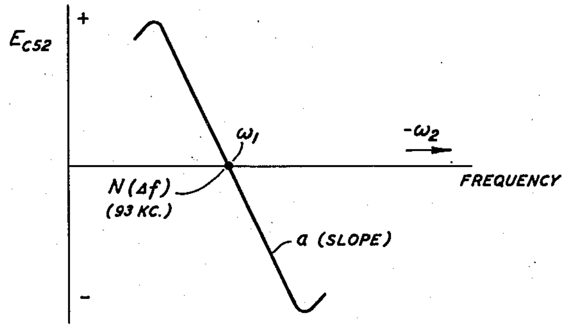
Fig. 5 is a characteristic of the frequency discriminator of Figs. 1 and 5.

It will now be shown that the frequency discriminator 17 in Fig. 2 provides a voltage component actuating the reactance tube 19 which is directly proportional to frequency error. By adjustment of the capacitances 45 and 46 in the frequency discriminator circuit 17 of Fig. 4, the center frequency of the latter discriminator, i. e., the input frequency to the discriminator for which zero control voltage is obtained at the discriminator 17 output, is made equal to the frequency corresponding to $\omega_1$ of the above Equation 3. As shown in Fig. 5, the characteristic of the frequency discriminator 17 is substantially linear between its maximum and minimum values and possesses a slope $a$. Accordingly, the voltage output of the frequency discriminator 17 is $$E_{C52}=a(\omega_1-\omega_2) \quad (4)$$

Constituting the "controller" voltage directly proportional to frequency error and actuating the reactance tube 19, $\omega_1$ and $\omega_2$ are as defined above.

With respect to the frequency of the controlled oscillator 10 as the regulated parameter of the electronic servomechanism, the frequency sensitive control loop, consisting of frequency discriminator 17, reactance tube 19, amplifier 11, multiplier 12, mixer 13, amplifier 16 and oscillator 10 of Fig. 1 provides proportional control by the Equation 4 above. The phase sensitive control loop, comprising phase discriminator 18, reactance tube 20, amplifier 11, multiplier 12, mixer 13, amplifier 16, and oscillator 10 provides the integral control in accordance with Equation 3 above.

The system of combined phase and frequency sensitive control as shown in Fig. 1, possesses advantages not found in systems having phase or frequency sensitive control alone, as will be now pointed out. In a control circuit which uses only a phase discriminator and associated reactance tube, the controlled oscillator may lock in at either of two sideband frequencies. These are $F+\Delta f$, and $F-\Delta f$, in which F is the high frequency reference input to the circuit of Fig. 1. Operation is at upper sideband when control is along the positive slope centered around $$\frac{\pi}{2}$$

of the phase discriminator output voltage curve in Fig. 7, and at lower sideband if control is along the negative slope centered around $$3\frac{\pi}{2}$$

Thus, an ambiguity of sideband exists, though the attribute of "zero frequency error" is retained as shown in the Pomeroy patent, supra. When only a frequency discriminator and reactance tube are used, lock-in is possible at only one of the two sideband frequencies, determined by the poling of the frequency discriminator output voltage. A frequency error, however, is present, which is essential to the operation of such a frequency sensitive control loop, as is well known in the art.

That a control circuit using only the phase discriminator type of control is capable of lock-in at either sideband may be seen from the following. In Fig. 1 the controlled oscillator 10 is maintained in upper sideband relation, $F+\Delta f$, to input frequency F, and operation on the phase discriminator characteristic is therefore along the positive $m$ slope in Fig. 7 as noted above. Assume now that the reactance tube 19 in the heretofore-traced frequency sensitive loop is momentarily removed from the circuit so that only the loop including the phase discriminator is operative. If the input frequency F is now slightly increased, this is reflected as a decrease in the frequency of $e_2$ in relation to $e_1$ so that the phase of $e_1$ advances over that of $e_2$ and increasing corrective voltage is developed at the phase discriminator 18 output, as indicated by Fig. 7, raising the frequency of controlled oscillator 10 through the means of reactance tube 20, thus eliminating the error. An opposite action occurs when the frequency F is decreased. With the frequency sensitive control loop still inoperative, control on the negative slope of the phase discriminator 18 occurs when the controlled oscillator 10 is in the lower sideband relation, $F-\Delta f$, to input frequency F. Under the latter condition, an increase to frequency F is reflected as an increase in the frequency of $e_2$ in relation to $e_1$, so that the phase of $e_1$ slips behind that of $e_2$ causing the point of operation on the negative slope of the phase discriminator 18 characteristic in Fig. 7 to move upwardly, thus increasing the frequency of controlled oscillator 10 and eliminating the error. As before, an opposite action occurs if F is decreased. Hence, there are two modes of control possible on the positive and negative $m$ slopes of Fig. 7, only one of which is generally desirable in a given circuit.

The frequency sensitive loop, including the frequency discriminator 17 is polarized for effecting synchronization, or frequency lock-in, at an upper or lower sideband, as desired, in a manner disclosed in the patent of S. W. Seeley, supra. This characteristic of the frequency sensitive loop is utilized in Fig. 1 wherein the polarity is preselected so as to effect the synchronization around the upper sideband. It is well understood in the art that synchronization could be effected at the lower sideband by transposing the output leads of the frequency discriminator 17 in Fig. 4.

A further point of difference between frequency and phase sensitive automatic control loops lies in the degree of frequency correction obtainable. A control loop employing a phase discriminator and associated reactance tube alone is, as hereinbefore indicated, capable of controlling the controllable oscillator, with "zero frequency error." This attribute is disclosed in the patent of A. F. Pomeroy, supra. Frequency control circuits embodying only frequency discriminators are able to effect control to within a few cycles of the desired predetermined frequency difference, but are not capable of "zero frequency error," that is, of effecting control to the exact predetermined frequency difference.

The combination in Fig. 1 of the two systems operating jointly, utilizes the phase sensitive discriminator to insure close control of oscillator frequency, and the polarizing property of the coarser frequency discriminator to eliminate the possibility of sychronization at either sideband and to select the particular one desired.

Still another difference is in the "response times" of frequency and phase sensitive automatic control circuits. As may be seen from Equation 3 above, no corrective force is present in a phase sensitive control loop at the instant of the application of a disturbance which disrupts the frequency synchronism between the inputs to the phase discriminator, since the value of the integral in the latter equation is always zero, at $t=0$. Assuming that the disturbance were due to an increment $\Delta f_1$, given to the frequency F in Fig. 1, the frequency of the controlled oscillator 10 does not immediately increase by the increment $\Delta f_1$, given to F, but approaches the steady state along an exponential time curve. A virtual delay is thus introduced into the phase sensitive loop of Fig. 1 by the integrating action of the phase discriminator 18. The delay occasioned by integration is shown for the case of the mechanical servo-mechanism in Section (2.2.2.), page 355, "Theory of servo systems, with particular reference to stabilization" by A. L. Whitely, published in the I. E. E. Transactions, volume 93, part II, 1946. Whitely's Equation 8 may be written.

$$\theta_0 = \frac{K}{p} \cdot \theta$$

Figure 3:
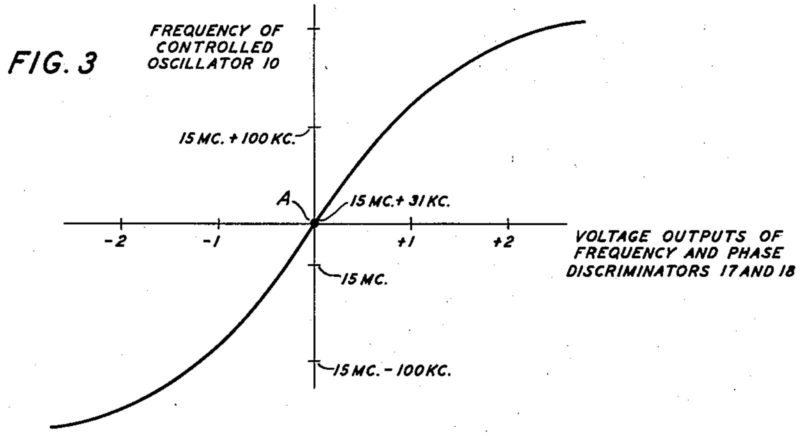
Fig. 3 is a characteristic of the two reactance tubes and the controlled oscillator of Figs. 1 and 2.

The latter equation, stated in words, means that the controlled "output" shaft of the mechanism is regulated according to the integral of the shaft error between reference and output shafts, the factor $$\frac{1}{p}$$

representing the operation of integration in Heaviside notation. As $E_1$ of Equation 3 herein is linearly related to the output frequency of controlled oscillator 10, as shown in Fig. 3, it is apparent that the latter equation is the analogue to the Whitely Equation 8 and consequently the Whitely statement regarding the creation of delay applies to the phase sensitive loop in Fig. 1. As shown by Equation 4 above, no such virtual delay is introduced by the frequency discriminator 17 in the frequency sensitive control loop of Fig. 1.

Figure 12:
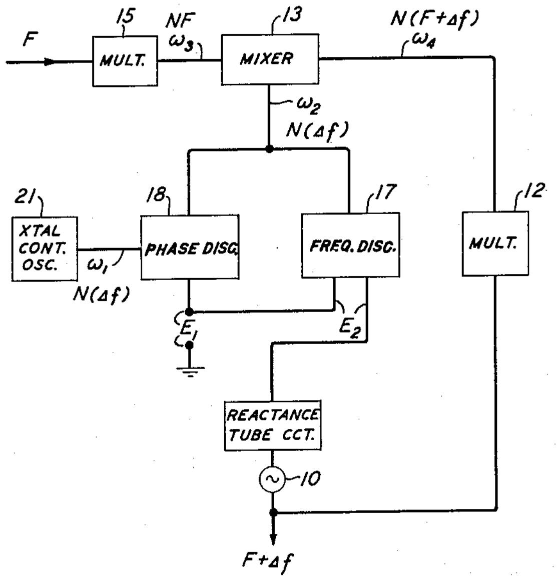
Fig. 12 is a box diagram representing the circuit of Fig. 1 functioning as a one-mesh frequency servo-mechanism.

Also in connection with the foregoing analysis, the controlled oscillator circuit of Fig. 1 may be viewed as one mesh frequency servo-mechanism as illustrated in Fig. 12 in which the quantity under control is the frequency of the voltage in the output of amplifier 16 in Fig. 1 and in which the voltage outputs of the frequency and phase discriminators 17 and 18 in Fig. 1 are effectively applied in series to a single reactance tube whereby the oscillations of oscillator tube 31 in Fig. 2 may be controlled in a manner that will now be explained. It is as equally valid to consider that the quantity specifically under control is the frequency of the voltage in the output of amplifier 16, as it is to consider that the frequency of the controlled oscillator 10 is under control, since the former implies the latter. For this discussion, delays in such one mesh frequency servo-mechanism are neglected. In the circuit of Fig. 1 the control voltage outputs of the frequency and phase discriminators 17 and 18, respectively, are applied in tandem or in parallel to the oscillation tube 31 in Fig. 2. This is the same in an electrical sense as when the voltage outputs of the two discriminators are applied in series to a single reactance tube circuit for controlling the oscillation tube 31 as just assumed for the purpose of further explanation and illustrated in Fig. 12. For this purpose the instantaneous velocities $\omega_1$, $\omega_2$, $\omega_3$ and $\omega_4$ in Fig. 12 correspond to the frequencies previously identified herein regarding Fig. 1.

Thus, $$E_2 + E_1 = \text{the total voltage error}$$

$$= a(\omega_1 - \omega_2) + m\int_0^t (\omega_1 - \omega_2)dt \qquad (5)$$

where $E_2$ and $E_1$ are the voltages across condensers 52 and 62 in Figs. 4 and 6, respectively; a $(\omega_1 - \omega_2)$ is proportional to the frequency error between the voltage outputs of amplifiers 16 and 22 in Fig. 1;

$$m\int_0^t (\omega_1 - \omega_2)dt$$

is the time integral of such frequency error; and the remaining terms represent values hereinbefore assigned.

Figure 13:
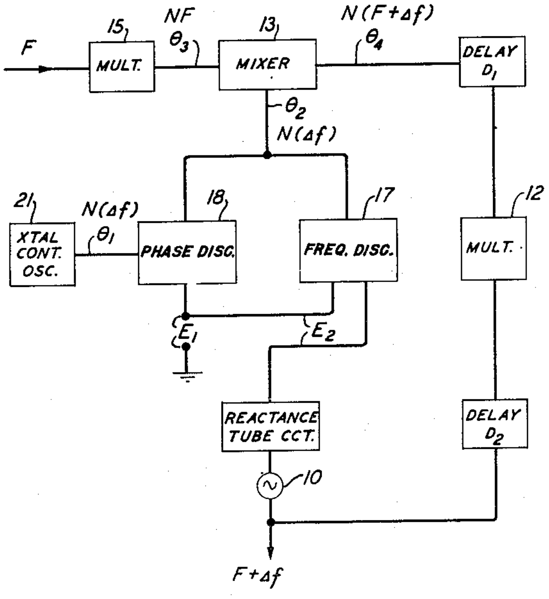
Fig. 13 is a box diagram representing the circuit of Fig. 1 functioning as a one-mesh phase servo-mechanism.

Finally, in the foregoing analysis the controlled oscillator circuit of Fig. 1 may be viewed as a one-mesh phase servo-mechanism as illustrated in Fig. 13 in which the quantity under control is the phase of the voltage in the output of amplifier 16 in Fig. 1 and in which the voltage outputs of the frequency and phase discriminators 17 and 18 in Fig. 1 are effectively applied in series to a single reactance tube for controlling the oscillations of tube 31 in Fig. 2 in a manner that will be presently mentioned. For this discussion certain delays $D_1$ and $D_2$, representing, for example, those introduced by the integrating aspect of the phase sensitive loop, the tuned circuits of amplifier 11 and multiplier 12, and the filter circuits of phase discriminator 18 and frequency discriminator 17 are considered. For this purpose the instantaneous angles $\theta_1$, $\theta_2$, $\theta_3$ and $\theta_4$ in Fig. 13 correspond to the frequencies and the instantaneous velocities $\omega_1$, $\omega_2$, $\omega_3$ and $\omega_4$, respectively, hereinbefore identified regarding Figs. 1 and 12, respectively.

From Equation 5, $$E_1 = m\int_0^t (\omega_1 - \omega_2)dt$$

$$\int_0^t \omega_1 dt = \theta_1$$

$$\int_0^t \omega_2 dt = \theta_2$$

therefore, $$E_1 = m(\theta_1 - \theta_2)$$

$$= m(\Delta\theta)$$

$\Delta\phi$ being the phase error of servo-mechanism.

From Equation 4, $$E_2 = a(\omega_1 - \omega_2)$$

$$\omega_1 = \frac{d\theta_1}{dt}$$

$$\omega_2 = \frac{d\theta_2}{dt}$$

Therefore, $$E_2 = a \cdot \frac{d(\theta_1 - \theta_2)}{dt}$$

$$= a\frac{d(\Delta\theta)}{dt}$$

Hence, $$E_1 + E_2 = \text{total voltage error}$$

$$= m(\Delta\theta) + a\frac{d(\Delta\theta)}{dt} \qquad (6)$$

where $E_1$ and $E_2$ are the voltages across condensers 62 and 52 in Figs. 6 and 4, respectively; $m$ and $a$ are constants of the slopes of the characteristics of the phase and frequency discriminators 18 and 17 in Figs. 7 and 5, respectively; $m(\Delta\theta)$ is proportional to the phase error between the voltage outputs of amplifiers 16 and 22 in Fig. 1, i. e., the change of relative phase of those two voltages; and $$a\frac{d(\Delta\theta)}{dt}$$

is proportional to the derivative of such phase error.

Thus, the derivative element $$a\frac{d(\Delta\theta)}{dt}$$

tends to stabilize the control of the over-all oscillator circuit in Fig. 1 at the predetermined fixed difference $\Delta f$ relative to the reference frequency F, i. e., at the upper sideband $F + \Delta f$, prevents lock-in at the unwanted sideband $F - \Delta f$, and in addition tends to preclude extraneous oscillation in the loop including the phase discriminator 18.

In the synchronized oscillator according to Fig. 1, the frequency of controlled oscillator 10 is locked in at the frequency $F+\Delta f$ by manually tuning the oscillation tube 31 in Fig. 2 past the "jump-in" frequency, the latter being that frequency at which the process of synchronization begins. In circuits employing only phase sensitive control, synchronization is often difficult because of the rapidly changing phase between the two voltage inputs to the phase discriminator prior to synchronization. The rate of change of this phase is frequently greater than that which can be converted into a corrective voltage at the output of the phase discriminator because of the time constant of the filter in the output thereof as shown, for example, in Fig. 6. For this reason the controlled oscillator 10 in Fig. 1 is not "pushed" into the desired synchronism with the frequency F of the input voltage. As a consequence, a state of extraneous oscillation often occurs in phase sensitive control loops. This is corroborated in an article "The carrier stabilization of frequency modulated transmitters," Brown Boveri Review, August 1946, at page 195.

The process of synchronization of the synchronized oscillator 10 of Fig. 1 is rendered uncritical by the presence of the frequency discriminator 17 therein. The voltage at the output of frequency discriminator 17, i. e., the charge on condenser 52 in Fig. 4, is proportional, as hereinbefore mentioned, to the rate of change of relative phase between the two alternating current inputs, i. e., from amplifiers 16 and 22 in Fig. 1, to the phase discriminator 18, and therefore serves to slow down the rate of change of such phase, just prior to lock-in at the desired predetermined frequency difference hereinbefore identified. The output filter of phase discriminator 18 in Fig. 6 can follow this lessened rate of phase change; and as a result the approach to the desired frequency lock-in proceeds smoothly.

Moreover, the presence of phase delays, of the type heretofore mentioned, in synchronized oscillator circuits employing only phase sensitive automatic control leads to instability of the sort encountered in mechanical servo-mechanisms wherein relatively large inertia elements are present. Such phase sensitive control loop is very often oscillatory due to the "response time lags." In the latter servo-mechanism an effective means of stabilization is the addition of derivatives of error to the error signal applied at the input of the automatic controller for such mechanical servo-mechanisms. In the over-all synchronized oscillator of Fig. 1, the derivative control exercised on the frequency of oscillation tube 31 resides in reactance 19 which is activated by "derivative of error" voltage from frequency discriminator 17. The effectiveness of so-called derivative control in stabilizing mechanical servo-mechanisms is disclosed in the "Theory of servo systems, with particular reference to stabilization" by A. L. Whitely in the I. E. E. Transactions, volume 93, part II, 1946, at pages 353 and 358.

It is understood that the above control principle represented by Equation 6, is not limited to its use in the embodiment disclosed above in Figs. 1, 12 and 13. For example, such principle may be readily utilized by those skilled in the art to maintain a controlled frequency equal to that of a reference source, i. e., at a zero frequency difference therebetween. This would mean that the controlled oscillator 10 in Fig. 1 could be so controlled by such principle as to have a frequency equal to that of the reference frequency F. In such case, the frequency difference $\Delta f$ in Fig. 1 would be zero.

Such principle may also be employed in the detection of frequency or phase modulated waves in the sense that it may be used to effectively narrow the frequency or phase deviation thereof thereby permitting the use of a narrower band intermediate frequency amplifier in a receiver of such modulated waves. By way of illustration, if in Fig. 12, multipliers 12 and 15 were deleted, and phase or frequency modulated carrier frequencies applied at the NF input to mixer 13 the action of the automatic control loop would tend to maintain a correspondence between the instantaneous frequency or phase of oscillator 10 and frequency or phase deviations of the carrier NF, resulting in frequency or phase deviations in $\omega_2$ of lessened magnitude, thus permitting the use of a narrow band intermediate frequency amplifier which would conceivably be inserted between mixer 13 and the discriminators 17 and 18. The voltages $E_1$ and $E_2$ would then be a measure of the instantaneous changes of modulation of the NF carrier applied to the mixer 13. A prior art receiving system for frequency modulated waves in which the above-described principle could be used to advantage is disclosed in the patent of J. G. Chaffee No. 2,118,161, issued May 24, 1938.

Another use of such principle resides in the generation of frequency and phase modulated waves wherein such modulation may be effected at a high degree of linearity. This may be seen from Fig. 12, where, due to the degenerative connections, a highly linear phase deviation of the oscillator 10 would be produced with respect to a modulating voltage inserted in series with the voltage $E_1+E_2$.

In addition to the foregoing uses of the above-discussed principle of Fig. 1, it will be understood that further uses may be readily visualized by those skilled in the art.

What is claimed is:

1. A system for automatically maintaining the frequency of the voltage of a variable oscillator locked at a predetermined fixed difference from the frequency of a reference voltage source, comprising a frequency discriminator for producing a voltage in accordance with changes in the frequency of a component preselected from the combined oscillator and reference voltages, a voltage source of standard frequency, a phase discriminator for producing a voltage in accordance with changes in the relative phase between said standard voltage and said preselected component, and means activated by said two discriminator output voltages for varying the frequency of said oscillator, said two discriminator output voltages having the form $$E_1+E_2=m(\Delta\theta)+a\frac{d(\Delta\theta)}{dt}$$

in which $E_1$ and $E_2$ are the voltages applied to said activated means from said phase and frequency discriminators, respectively; $m$ and $a$ are the slope constants of the characteristics of the phase and frequency discriminators, respectively; $(\Delta\theta)$ is the change of relative phase between the standard voltage and preselected component; $m(\Delta\theta)$ is proportional to such phase change; and $$a\frac{d(\Delta\theta)}{dt}$$

is proportional to the derivative of such phase change.

2. In a system for automatically maintaining the voltages of a variable oscillator and a reference source electrically locked at a predetermined frequency difference therebetween, said oscillator including means for controlling the frequency thereof a mixer connected to said oscillator and source, a phase sensitive circuit, a frequency sensitive circuit, circuit means for applying a voltage of preselected frequency from the output of said mixer to the inputs of said phase and frequency sensitive circuits, said frequency sensitive circuit producing a potential varying in sign and magnitude in accordance with changes in the preselected frequency of the voltage applied to the input thereof, a voltage source of constant frequency which is identical with that of said preselected voltage and which is applied to a second input of said phase sensitive circuit, said phase sensitive circuit producing a voltage varying in sign and magnitude in accordance with changes in the relative phase between the constant and preselected voltages, and further circuit means for connectng the outputs of said frequency and phase sensitive circuits to said oscillator frequency control means for translating changes of said potentials from said frequency and phase sensitive circuits into proportional changes of the frequency of said oscillator, said last-mentioned frequency changes automatically maintaining the frequency of said oscillator locked at the predetermined difference from the frequency of said reference source.

3. A system according to claim 2 in which the voltage applied from the output of said phase sensitive circuit to said further circuit means is proportional to the change in the relative phase between the constant and preselected voltages applied to the inputs of said phase sensitive circuit, and the voltage applied from the output of said frequency sensitive circuit to said further circuit means is proportional to the derivative of the change of relative phase between the constant and preselected voltages.

4. A system according to claim 2 in which the two voltages applied to said further circuit means have the form $$E_1+E_2=m(\Delta\theta)+a\frac{d(\Delta\theta)}{dt}$$

in which $E_1$ and $E_2$ are the voltages applied by said phase and frequency sensitive circuits, respectively, to said farther circuit means; $m$ and $a$ are the slope constants of the characteristics of said phase and frequency sensitive circuits, respectively; $(\Delta\theta)$ is the change in relative phase between the constant and preselected voltages; $m(\Delta\theta)$ is proportional to such phase change; and $$a\frac{d(\Delta\theta)}{dt}$$

is proportional to the derivative of such phase change.

5. A system according to claim 2 in which said frequency sensitive circuit is substantially instantaneously responsive to activate said further circuit means and thereby said controlling means in response to a change in the preselected frequency of the voltage applied to the input thereof to vary substantially instantaneously the frequency of said oscillator, said last-mentioned variation in the frequency of said oscillator tending to reduce the change of said preselected frequency, and said phase sensitive circuit is thereafter responsive to the change of the relative phase between the constant and reference voltages to additionally activate said further circuit means and thereby said controlling means to further vary the frequency of said oscillator, said last-mentioned variation in the frequency of said oscillator tending to reduce to zero the change of said preselected frequency.

6. A system according to claim 2 in which the frequency of said oscillator is automatically locked from the frequency of said reference source at a predetermined difference which has a numerical value greater than zero.

7. A system according to claim 2 in which the frequency of said oscillator is automatically locked at the frequency of said reference source.

8. In an electronic oscillator having an output voltage whose frequency is controllable relative to the frequency of a voltage supplied by a reference source, a generator of a voltage having a constant frequency, reactive means variable in effective reactance for controlling the frequency of said oscillator, means for deriving a voltage from one portion of a preselected output from the combined outputs of said oscillator and source, and means for deriving another voltage from the output of said constant generator and from a second portion of said preselected output derived from the combined outputs of said oscillator and source, said two derived voltages activating said reactive means to control the frequency of said oscillator relative to the frequency of said reference source, said second-mentioned derived voltage being proportional to the change of relative phase between said constant frequency and the frequency of the second portion of said preselected output derived from the combined outputs of oscillator and source, said first-mentioned derived voltage varying in accordance with the derivative of such change of relative phase.

9. A system including an oscillator whose frequency is controllable, a source of reference frequency, and means for automatically maintaining the frequency of said oscillator locked at a predetermined fixed frequency difference from the reference frequency, said means comprising a first multiplier for multiplying the reference frequency by a preselected factor, a second multiplier for multiplying the frequency of the controllable oscillator by said preselected factor, means for deriving from the outputs of said two multipliers a voltage whose frequency is equal to the difference between the reference frequency multiplied by said preselected multiplication factor and the oscillator frequency multiplied by said preselected multiplication factor, a generator of a constant frequency which is exactly equal to the predetermined frequency difference between said oscillator and reference source multiplied by said preselected multiplication factor, a phase discriminator having two inputs one of which is connected to said generator and the other to said deriving means for producing an output voltage proportional to the change in the relative phase between the constant frequency and the frequency of one portion of said derived voltage, a frequency discriminator having its input connected to said deriving means for producing an output voltage in accordance with a derivative of the change in relative phase between the constant frequency and the frequency of a second portion of said derived voltage, and reactive means connecting the outputs of said phase and frequency discriminators to said oscillator, said reactive means translating said two discriminator output voltages into corresponding changes in the effective reactance of said reactive means whereby the frequency of said oscillator is automatically maintained locked at the predetermined fixed difference from the reference frequency.

10. A system according to claim 9 in which further reactive means controls the frequency of said oscillator, and said connecting reactive means comprises two discrete reactive means, one of said discrete reactive means connects the output of said frequency discriminator to said further reactive means for translating the frequency discriminator output voltage into a corresponding change in the effective reactance of said further reactive means, and the other of said discrete reactive means connects the output of said phase discriminator to said further reactive means for translating the phase discriminator output voltage into a corresponding change in the effective reactance of said further reactive means, such two changes in the effective reactance of said further reactive means controls the frequency of said oscillator whereby the last-mentioned frequency is automatically maintained locked at the predetermined fixed difference from the reference frequency.

DANIEL LEED.

No references cited.